United States Patent
Faibish et al.

(10) Patent No.: US 10,078,639 B1
(45) Date of Patent: Sep. 18, 2018

(54) CLUSTER FILE SYSTEM COMPRISING DATA MOVER MODULES HAVING ASSOCIATED QUOTA MANAGER FOR MANAGING BACK-END USER QUOTAS

(71) Applicant: EMC Corporation, Hopkinton, MA (US)

(72) Inventors: Sorin Faibish, Newton, MA (US); Sassan Teymouri, Saratoga, CA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 812 days.

(21) Appl. No.: 14/499,429

(22) Filed: Sep. 29, 2014

(51) Int. Cl.
*G06F 17/30* (2006.01)

(52) U.S. Cl.
CPC .. *G06F 17/30073* (2013.01); *G06F 17/30082* (2013.01); *G06F 17/30221* (2013.01)

(58) Field of Classification Search
CPC ................................................ G06F 17/30073
See application file for complete search history.

(56) References Cited

U.S. PATENT DOCUMENTS

| | | | | |
|---|---|---|---|---|
| 5,737,747 | A * | 4/1998 | Vishlitzky | G06F 12/0866 348/E5.008 |
| 7,769,722 | B1 * | 8/2010 | Bergant | G06F 11/2097 707/681 |
| 8,387,054 | B1 * | 2/2013 | Zeis | G06F 9/4881 709/226 |
| 2004/0133540 | A1 * | 7/2004 | Saake | G06F 17/30073 |
| 2012/0096059 | A1 * | 4/2012 | Shimizu | G06F 3/061 707/828 |
| 2013/0159364 | A1 * | 6/2013 | Grider | G06F 17/30224 707/826 |

(Continued)

OTHER PUBLICATIONS

J. Bent et al., "PLFS: A Checkpoint Filesystem for Parallel Applications," ACM Proceedings of the Conference on High Performance Computing Networking, Storage and Analysis (SC09), Nov. 2009, pp. 1-12.

(Continued)

*Primary Examiner* — Rehana Perveen
*Assistant Examiner* — Loc Tran
(74) *Attorney, Agent, or Firm* — Ryan, Mason & Lewis, LLP (57) ABSTRACT

A cluster file system comprises a front-end file system, a back-end file system, data mover modules arranged between the front-end and back-end file systems, and a quota manager associated with at least a given one of data mover modules. The data mover modules are configured to control archiving of data between the front-end file system and the back-end file system for respective users based at least in part on respective user quotas established by the quota manager and identifying corresponding portions of the back-end file system available to the users. The front-end file system may comprise archive directories configured for respective ones of the users, with the data mover modules being configured to archive a given file from the front-end file system in the back-end file system responsive to a link to that file being stored in a corresponding one of the archive directories of the front-end file system.

20 Claims, 6 Drawing Sheets

(56) References Cited

U.S. PATENT DOCUMENTS

2014/0172792 A1* 6/2014 Kabano ............ G06F 17/30578
707/625
2015/0263900 A1* 9/2015 Polyakov ................ H04L 67/10
709/203

OTHER PUBLICATIONS

Cluster File Systems, Inc., "Lustre: A Scalable, High-Performance File System," Nov. 2002, pp. 1-13.
F. Wang et al., "Understanding Lustre Filesystem Internals," National Center for Computational Sciences, Tech Report ORNL/TM-2009/117, Apr. 2009, pp. 1-80.

* cited by examiner

CLUSTER FILE SYSTEM COMPRISING DATA MOVER MODULES HAVING ASSOCIATED QUOTA MANAGER FOR MANAGING BACK-END USER QUOTAS

FIELD

The field relates generally to information processing systems, and more particularly to information processing systems that incorporate cluster file systems.

BACKGROUND

It is common in high-performance computing (HPC) systems and other information processing systems for multiple compute nodes to access a cluster file system. For example, HPC systems such as supercomputers typically include large numbers of compute nodes that access a parallel file system, distributed file system or other type of cluster file system. A cluster file system as the term is broadly used herein generally allows multiple compute nodes or other types of clients to share access to files over a network.

One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (JO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and JO throughput. JO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

For example, certain types of highly cost effective storage, such as scale-out network attached storage, are often seen as failing to provide performance characteristics that are adequate for use with supercomputers and other complex computing environments that utilize Lustre file systems.

Accordingly, despite the many advantages of Lustre file systems and other similar cluster file systems, a need remains for additional improvements, particularly with regard to JO operations. For example, further acceleration of JO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement both a front-end file system and a back-end file system, with a plurality of intermediate data mover modules and an associated quota manager controlling movement of data between the front-end and back-end file systems, so as to provide significant improvements relative to conventional arrangements.

In one embodiment, a cluster file system comprises a front-end file system, a back-end file system, data mover modules arranged between the front-end and back-end file systems, and a quota manager associated with at least a given one of data mover modules. The data mover modules are configured to control archiving of data between the front-end file system and the back-end file system for respective users based at least in part on respective user quotas established by the quota manager and identifying corresponding portions of the back-end file system available to the users.

The front-end file system may comprise archive directories configured for respective ones of the users, with the data mover modules being configured to archive a given file from the front-end file system in the back-end file system responsive to a link to that file being stored in a corresponding one of the archive directories of the front-end file system.

As noted above, illustrative embodiments described herein provide significant improvements relative to conventional arrangements. In some of these embodiments, the quota manager facilitates the provision of optimal hierarchical storage management with selective archiving of files in the back-end file system. This helps to ensure that the allocated portions of the back-end file system are appropriately sized for their respective users, while also avoiding unnecessary archiving of scratch files or other temporary files that would otherwise waste archive space in the back-end file system. The allocated portions of the back-end file system can grow or shrink as needed to accommodate the changing requirements of the respective users. For example, the quota manager can proactively recommend increases or decreases in the archive space allocated to respective users, therefore ensuring that there will always be adequate space to archive desired application files.

Other embodiments include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
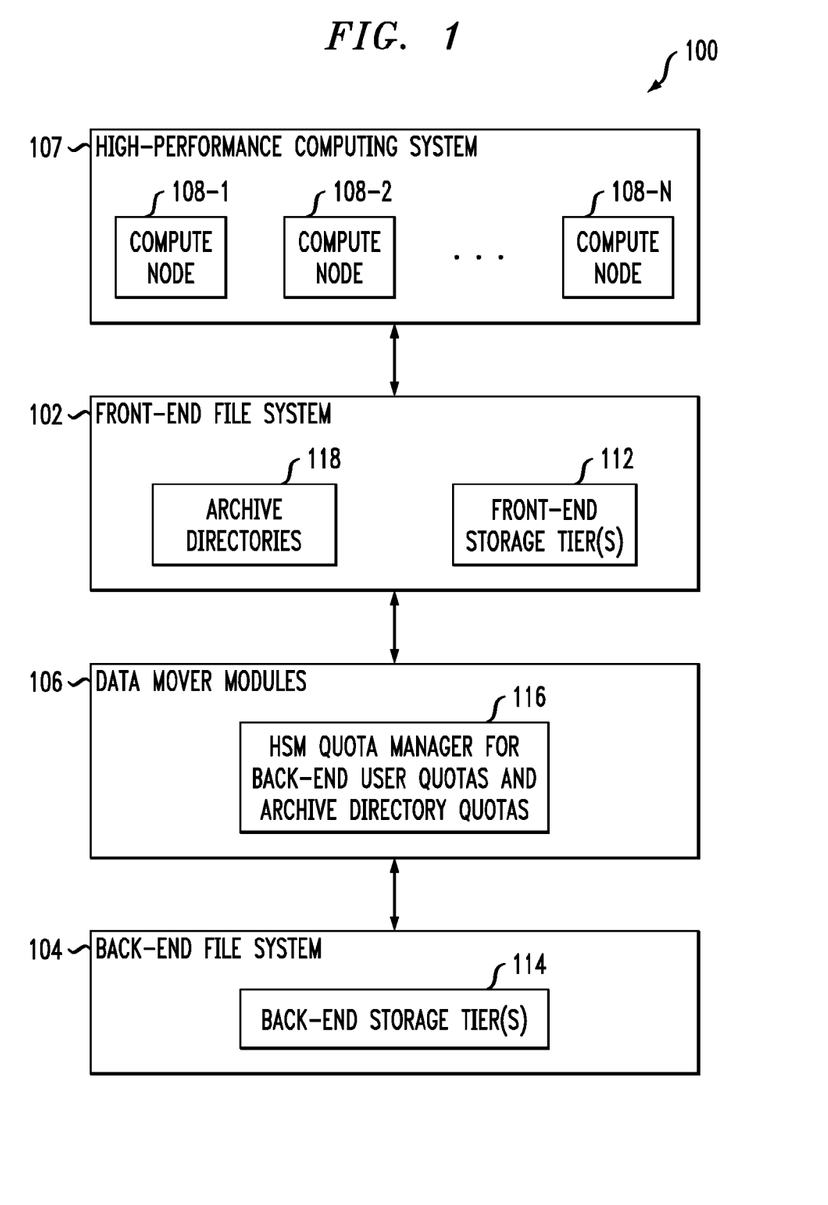
FIG. 1 is a block diagram of an information processing system implementing a cluster file system comprising data mover modules and an associated quota manager for managing back-end user quotas in an illustrative embodiment of the invention.

FIG. 1 shows an information processing system 100 configured in accordance with an illustrative embodiment of the present invention. The information processing system 100 comprises a front-end file system 102, a back-end file system 104 and a plurality of data mover modules 106 arranged between the front-end and back-end file systems 102 and 104. The information processing system 100 further comprises an HPC system 107 comprising a plurality of compute nodes 108-1, 108-2, . . . 108-N. The compute nodes 108 of the HPC system 107 are coupled to the front-end file system 102, but may additionally or alternatively be coupled to or otherwise associated with other system components in other embodiments. For example, in some embodiments, the data mover modules 106 can be implemented at least in part utilizing software running on the compute nodes 108.

The front-end file system 102 and back-end file system 104 in the present embodiment are associated with respective different sets of one or more hierarchical storage tiers for use in hierarchical storage management (HSM).

In the present embodiment, the front-end file system 102 and back-end file system 104 are assumed to be of different types. More particularly, the front-end file system 102 comprises one or more front-end storage tiers 112 which may comprise, for example, object storage server or OSS tiers, and the back-end file system 104 comprises one or more back-end storage tiers 114 which may comprise, for example, scale-out network attached storage or scale-out NAS tiers. In such an arrangement of the front-end and back-end storage tiers 112 and 114, the OSS tiers are illustratively implemented using a Lustre file system, and the scale-out NAS tiers are illustratively implemented using nodes of a scale-out NAS cluster. Numerous other types of storage tiers, as well as combinations of multiple types of storage tiers, can be utilized in implementing each of the front-end and back-end storage tiers 112 and 114.

The data mover modules 106 in the present embodiment illustratively have associated therewith an HSM quota manager 116. The data mover modules 106 are configured to control archiving of data between the front-end file system 102 and the back-end file system 104 for respective users based at least in part on respective user quotas established by the quota manager 116 and identifying corresponding portions of the back-end file system 104 available to those users. The quota manager 116 is illustratively implemented internally to at least a given one of the data mover modules 106.

The "users" in this embodiment may refer, for example, to respective ones of the compute nodes 108, although the term "user" as utilized herein is intended to be broadly construed so as to encompass numerous other arrangements of human, hardware, software or firmware entities, as well as combinations of such entities.

The data mover modules 106 enforce the respective back-end user quotas established by the quota manager 116 for the respective users. The quota manager 116 in some embodiments includes an associated policy engine providing one or more policies for use by the quota manager 116 in establishing the back-end user quotas.

In some embodiments, there are multiple back-end file systems of different types. An example of such an embodiment will be described below in conjunction with FIG. 5. For such embodiments, the data mover modules 106 are illustratively configured to control archiving of data between the front-end file system 102 and each of the multiple back-end file systems responsive to user quotas established by the quota manager 116 for each of the back-end file systems.

Although multiple data mover modules 106 are utilized in the present embodiment, it is possible in other embodiments to utilize only a single data mover module. Also, although the quota manager 116 in the present embodiment is shown as being arranged internally to at least one of the data mover modules 106, the quota manager 116 in other embodiments can be implemented at least in part within other system components, such as the front-end file system 102 or the compute nodes 108 of the HPC 107, or as an entirely separate component that communicates with one or more of the data mover modules 106.

The front-end file system 102 in the present embodiment comprises a plurality of archive directories 118 configured for respective ones of the above-noted users. The archive directories 118 illustratively include the respective user quotas that identify corresponding portions of the back-end file system 104 available to those users, and may include additional or alternative information.

The data mover modules 106 are configured to archive a given file from the front-end file system 102 in the back-end file system 104 responsive to a link to that file being stored in a corresponding one of the archive directories 118 of the front-end file system 102. Additionally or alternatively, files from the front-end file system 102 can be configured for archiving in the back-end file system 104 by storing the files themselves in the appropriate ones of the archive directories 118.

Such an arrangement is beneficial in that it provides a high degree of control over the particular types of files from the front-end file system 102 that are archived in the back-end file system 104. For example, archiving of temporary files from the front-end file system 102 in the back-end file system 104 can be effectively prevented by preventing storage of the temporary files or links to the temporary files in the archive directories 118.

In operation, a given user can store links in its corresponding archive directory for only those files that are known to be needed later on. The user will not store links for scratch files and other temporary files, and as a result those files will not be archived and will not waste archive space. As noted above, the data mover modules 106 are configured to archive those files for which links to those files have been stored in the archive directories 118. Accordingly, there is no need to copy or move into the archive directory the actual files that need to be archived, as respective stored links for these files identify them to the data mover modules 106 as appropriate targets for archiving in the back-end file system 104.

The quota manager 116 in the present embodiment not only establishes the above-noted back-end user quotas, but also establishes archive directory quotas for respective ones of the archive directories 118. Moreover, the quota manager 116 proactively recommends changes to the archive directory quotas based on current sizes of the archive directories 118 relative to the established archive directory quotas. Similar adjustments can be made to the back-end user quotas based on amounts of the respective allocated portions of the back-end file system that are currently being utilized by the corresponding users. For example, the back-end file system can be dynamically reallocated among the users by appropriate adjustment of the corresponding back-end user quotas.

The quota manager 116 in the present embodiment facilitates the provision of optimal HSM with selective archiving of files in the back-end file system 104. This helps to ensure that the allocated portions of the back-end file system are appropriately sized for their respective users, while also avoiding unnecessary archiving of scratch files or other temporary files that would otherwise waste archive space in the back-end file system. The allocated portions of the back-end file system can grow or shrink as needed to accommodate the changing requirements of the respective users. For example, the quota manager 116 can proactively recommend increases or decreases in the archive space allocated to respective users, therefore ensuring that there will always be adequate space to archive desired application files.

Additional details regarding exemplary quota manager functionality will be described below in conjunction with the embodiment of FIG. 3. Similar functionality can be incorporated into the quota manager 116 of FIG. 1.

Also, although the quota manager 116 of FIG. 1 is configured to manage both back-end user quotas and archive directory quotas, this is by way of illustrative example only, and in other embodiments a given quota manager may instead be configured to manage only back-end user quotas or only archive directory quotas.

The front-end file system 102 in some embodiments is configured to include an HSM API for communicating with one or more of the data mover modules 106. Such an API may comprise a Lustre HSM API of the type implemented in version 2.5 of the Lustre file system, although other types of HSM APIs may be used in other embodiments.

Through such an HSM API, a given one of the data mover modules 106 may be provided with information that allows it to control archiving and other movement of data between front-end and back-end file systems.

By way of example, a given one of the data mover modules 106 may be configured in the form of a multi-threaded application that communicates with a corresponding HSM API of the front-end file system 102. The information received in the given data mover module via the HSM API illustratively comprises commands to move files from the front-end file system 102 to the back-end file system 104 and to restore files from the back-end file system 104 to the front-end file system 102. In other embodiments, the front-end file system 102 need not include any HSM APIs, and can instead utilize other types of interfaces for communicating with the data mover modules 106.

The term "data movement" as used in this and other contexts herein is intended to be broadly construed, so as to encompass data migration as well as other types of movement of data between storage tiers, including various types of data movement that may be associated with the above-described archiving of data between the front-end file system 102 and the back-end file system 104.

Conventional aspects of Lustre file systems suitable for use in implementing the front-end file system 102 are described in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

Scale-out NAS cluster tiers of the back-end file system 104 and other scale-out NAS clusters referred to herein may be implemented, for example, using Isilon® storage platforms, such as storage platforms comprising Isilon® platform nodes and associated accelerators in the S-Series, X-Series and NL-Series product lines, commercially available from EMC Corporation of Hopkinton, Mass.

Other types of storage products that may be used to implement portions of one or more of the file systems 102 and 104 of the system 100 include storage arrays such as VNX® and Symmetrix VMAX®, both also commercially available from EMC Corporation. A variety of other storage products may be utilized to implement at least a portion of a front-end or back-end file system.

The data mover modules 106 are adapted for communication with front-end file system 102, possibly via HSM APIs of the type noted above. For example, a given one of the data mover modules 106 may be configured to control movement of data between the front-end file system 102 and the back-end file system 104 responsive to information received via a corresponding one of the HSM APIs.

The movement of data may include, for example, movement of data between at least one of the OSS tiers and one or more of the scale-out NAS cluster tiers, and may additionally or alternatively involve movement of data between multiple OSS tiers or between multiple scale-out NAS cluster tiers.

The different storage tiers in a given set of multiple storage tiers in this embodiment illustratively comprise different types of storage devices having different performance characteristics. For example, each of a plurality of OSS servers of a given one of the OSS tiers is illustratively configured to interface with a corresponding OST in the form of a flash storage device, and each of the scale-out NAS nodes of a given one of the scale-out NAS storage tiers comprises a disk storage device.

The flash storage devices of the given OSS tier are generally significantly faster in terms of read and write access times than the disk storage devices of the given scale-out NAS cluster tier. The flash storage devices are therefore considered "fast" devices in this embodiment relative to the "slow" disk storage devices. Accordingly, the hierarchical storage management may be characterized in the present embodiment as having a "fast" storage tier 112 and a "slow" storage tier 114, where "fast" and "slow" in this context are relative terms and not intended to denote any particular absolute performance level. However, numerous alternative tiering arrangements may be used, including arrangements with three or more tiers each providing a different level of performance. The particular storage devices used in a given storage tier may be varied in other embodiments, and multiple distinct storage device types may be used within a single storage tier.

The flash storage devices may be implemented, by way of example, using respective flash Peripheral Component Interconnect Express (PCIe) cards or other types of memory cards installed in a computer or other processing device that implements the corresponding OSS. Numerous alternative arrangements are possible. Also, a variety of other types of non-volatile or volatile memory in any combination may be used in place of the flash storage devices. Examples of alternatives to flash storage devices that may be used as respective OSTs or as other types of storage system elements in other embodiments of the invention include non-volatile memories such as magnetic random access memory (MRAM) and phase change random access memory (PC-RAM).

The flash storage devices of the given OSS tier generally provide higher performance than the disk storage devices of the given scale-out NAS cluster tier but the disk storage devices generally provide higher capacity at lower cost than the flash storage devices. The exemplary tiering arrangement using one or more OSS tiers and one or more scale-out NAS cluster tiers therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

Also, such an arrangement allows the system 100 to obtain the performance advantages of an OSS storage tier as well as the storage capacity and cost benefits associated with use of scale-out network attached storage. Accordingly, implementation of scale-out network attached storage is facilitated in supercomputers and other complex computing environments that utilize Lustre file systems.

In the FIG. 1 embodiment, as in other embodiments described herein, an OSS tier is also referred to as a "fast" storage tier and a scale-out NAS cluster tier is also referred to as a "slow" storage tier. Again, the terms "fast" and "slow" in this context are relative terms and should not be construed as requiring any particular absolute performance levels.

These particular tiering arrangements should be considered exemplary only, and numerous alternative arrangements of storage tiers may be utilized in providing the one or more front-end tiers 112 of the front-end file system 102 and the one or more back-end tiers 114 of the back-end file system 104 in other embodiments. For example, additional or alternative storage tiers may be implemented between the front-end file system 102 and the HPC system 107 utilizing one or more burst buffer appliances.

A given such burst buffer appliance is generally configured to accelerate IO operations between the compute nodes 108 and the front-end file system 102 by storing associated data in its burst buffers. The term "burst buffer appliance" as used herein is intended to be broadly construed, so as to encompass any network appliance or other arrangement of hardware and associated software or firmware that collectively provides multiple burst buffers implemented using high-speed storage devices.

Thus, a burst buffer appliance may be viewed as providing a high-speed memory that serves as a buffer between the compute nodes 108 of the HPC system 107 and the front-end file system 102, for storing bursts of data associated with different types of IO operations.

Other embodiments may include multiple burst buffer appliances, with each such appliance adapted for coupling between at least a portion of the front-end file system 102 and one or more compute nodes 108 of the HPC system 107.

In still further embodiments, one or more burst buffer appliances may be incorporated into the front-end file system 102 itself and utilized to implement at least a portion of the one or more front-end storage tiers 112.

It is also to be appreciated that the use of OSS tiers and scale-out NAS cluster tiers is not a requirement, and numerous additional or alternative file systems can be used in implementing at least portions of one or more of the front-end file system 102 and the back-end file system 104. For example, file systems such as Hadoop Distributed File System (HDFS), General Parallel File System (GPFS), Network File System (NFS), PanFS and numerous others can be used, possibly in combination with a Lustre file system or other types of object stores such as EMC ATMOS or Ceph. Various other combinations of these and other file systems can also be used in other embodiments.

In the present embodiment, the front-end file system 102, the back-end file system 104 and the data mover modules 106 collectively provide an exemplary implementation of what is more generally referred to herein as a cluster file system. As indicated above, portions of a cluster file system may be implemented as a distributed file system such as HDFS, a parallel file system such as GPFS or as a combination of a Lustre file system with HDFS, GPFS or other parallel or distributed file systems. The term "cluster file system" as used herein is therefore intended to be broadly construed, so as to encompass a wide variety of different file systems that can be shared by clusters of compute nodes, as well as various combinations of such file systems.

As mentioned previously, although only a single back-end file system is shown in the FIG. 1 embodiment, other embodiments may include multiple back-end file systems with the data mover modules 106 being configured to control movement of data between the front-end file system and each of the back-end file systems, possibly responsive to information received via HSM APIs. For example, the multiple back-end file systems may comprise one or more object stores and one or more scale-out NAS clusters.

The HPC system 107 may comprise, for example, a supercomputer. Such an HPC system is an example of what is more generally referred to herein as a "computer system." Each of the compute nodes 108 may comprise or otherwise correspond to one or more clients of the information processing system 100.

Accordingly, one or more clients may be implemented as respective components of each of the compute nodes 108. The term "client" as used herein is therefore intended to be broadly construed, so as to encompass, for example, a compute node or a component thereof. Such a component may be implemented in software, and therefore a "client" as the term is utilized herein may comprise a software component associated with one of the compute nodes 108 of the HPC system 107.

The data mover modules 106 may be configured to control movement of data between the storage tiers 112 and 114 of the respective front-end and back-end file systems 102 and 104 in order to facilitate achievement of desired levels of performance by the clients.

The data mover modules 106 are illustratively shown as being implemented externally to the HPC system 107 in the present embodiment, but in other embodiments can be implemented at least in part on the compute nodes 108.

Numerous other types and arrangements of cluster file systems and computer systems may be used in other embodiments of the invention.

Although some embodiments utilize one or more burst buffer appliances in the front-end file system 102, or coupled between the front-end file system 102 and the compute nodes 108 of the HPC system 107, use of burst buffer appliances is optional and may be eliminated in other embodiments.

As indicated above, the data mover modules 106 control movement of data between storage tiers of the front-end and back-end file systems 102 and 104, taking into account current operating conditions and other factors, possibly based at least in part on information received via HSM APIs of the front-end file system 102.

Data movement determinations made by the data mover modules 106 are illustratively performed in cooperation with one or more job schedulers of the information processing system 100. For example, data movement determinations can be made at least in part utilizing a job scheduler of the system 100 responsive to JO requests received in the job scheduler from one or more applications running on the compute nodes 108. Such JO requests and other similar requests referred to herein may be configured, for example, in accordance with standard portable operating system interface (POSIX) system calls. Data movement determinations can be implemented differently for each of a plurality of processing jobs, thereby effectively allowing dynamic data migration on a per-job basis.

The data mover modules 106 can also be configured to update stored metadata responsive to movement of data between the storage tiers 112 and 114.

The data mover modules 106 in some embodiments each comprise a plurality of server nodes that are synchronized with one another utilizing a message passing interface (MPI) protocol. The server nodes can be implemented using the compute nodes 108, or other arrangements of one or more processing devices, including, for example, one or more processing devices that are each coupled to the front-end file system 102, the back-end file system 104 and the HPC system 107. A data mover module arrangement of this type is considered an example of an embodiment in which the data mover module is arranged between the front-end and back-end file systems. In other words, additional coupling or other association of a given one of the data mover modules 106 with the HPC system 107 does not prevent the data mover module from being effectively arranged between the front-end file system 102 and the back-end file system 104.

One or more of the data mover modules 106 in some embodiments are each configured to split a given file received from the front-end file system 102 into multiple smaller files for storage in the back-end file system 104 and to associate with each of the smaller files a corresponding file extension from a designated namespace so as to permit the given file to be reconstructed upon retrieval of the smaller files from the back-end file system 104. Such file-splitting effectively allows a Lustre-based implementation of the front-end file system 102 to utilize Isilon® platform nodes or other types of scale-out NAS clusters as HSM targets, thereby providing enhanced flexibility in storage tiering and a better balance between performance and cost in the information processing system 100.

This is in contrast to conventional practice, where scale-out NAS clusters that have file size limitations often cannot be used as a Lustre file system HSM target, because the Lustre file system often has file sizes well above the file size limitations of the scale-out NAS clusters. For example, some Isilon® platform nodes have file size limits of only 4 terabytes (TB), while Lustre file systems often store files with sizes on the order of 10-50 TB or more.

Accordingly, under this conventional practice, it is not possible to utilize Isilon® platform nodes as HSM targets of a Lustre file system. Embodiments of the present invention advantageously overcome this significant deficiency of conventional practice, thereby allowing Isilon® platform nodes, other scale-out NAS cluster nodes and other types of back-end file systems to be used as HSM targets.

Similar advantages are obtained using alternative implementations of the data mover modules 106. For example, in other embodiments, each data mover module is implemented at least in part utilizing a virtual layer of a parallel log-structured file system (PLFS). In such an embodiment, the virtual layer may comprise PLFS middleware configured to migrate files between the front-end and back-end file systems.

Although the data mover modules 106 are illustratively shown as being separate from the file systems 102 and 104 in the figure, components such as the PLFS middleware may be implemented using the OSSs of the OSS tiers as well as scale-out NAS nodes of the scale-out NAS cluster tiers. For example, each of the sets of storage tiers 112 and 114 may be viewed as implementing a corresponding virtual layer of PLFS functionality within the cluster file system of the information processing system 100.

A given such PLFS virtual layer represents at least a portion of what is more generally referred to herein as a virtual file system. It should be understood that other types of virtual file systems can be used to implement at least a portion of the data mover modules 106 in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the front-end file system 102, the back-end file system 104, the data mover modules 106 and the HPC system 107 comprising compute nodes 108 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the front-end file system 102, back-end file system 104 and compute nodes 108, the data mover modules 106 in other embodiments may be implemented at least in part within one or more of these system elements. It is also to be appreciated that a given embodiment of the information processing system 100 may include multiple instances of one or more of the front-end file system 102, the back-end file system 104, the set of data mover modules 106 and the HPC system 107 comprising the set of N compute nodes 108, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is suitable for use in the system 100 but is more generally applicable to other systems comprising one or more data mover modules arranged between a front-end file system and a back-end file system.

In step 200, data mover modules are configured for arrangement between a front-end file system and a back-end file system. With reference to the FIG. 1 embodiment, the data mover modules 106 are implemented between the front-end file system 102 and the back-end file system 104. The data mover modules 106 in the FIG. 1 embodiment are not shown as being directly coupled to the HPC system 107. However, in other embodiments, the data mover modules are implemented at least in part on the compute nodes 108 themselves, for example, using PLFS clients running on respective ones of the compute nodes.

In step 202, a quota manager associated with at least a given one of the data mover modules is configured. In the FIG. 1 embodiment, the HSM quota manager 116 is configured for management of both back-end user quotas and archive directory quotas, although in other embodiments, for example, the quota manager 116 may be configured to manage only back-end user quotas or only archive directory quotas.

In step 204, the quota manager establishes user quotas identifying corresponding portions of the back-end file system available to respective users. These are the above-noted back-end user quotas. In the FIG. 1 embodiment, the users may correspond to respective ones of the compute nodes 108 of the HPC 107. The quota manager 116 establishes these quotas, possibly based at least in part on one or more policies obtained from a policy engine coupled to or otherwise associated with the quota manager 116. As indicated above, the quota manager 116 can be implemented, for example, internally to one or more of the data mover modules 106.

In step 206, archiving of data between the front-end file system and the back-end file system is controlled based at least in part on the established user quotas. For example, in the FIG. 1 embodiment, the archiving of data is controlled based at least in part on the established user quotas, with the data mover modules 106 enforcing the respective user quotas for their corresponding users. Moreover, the archive directories 118 of the front-end file system 102 are configured for respective ones of the users, and controlling archiving in step 206 further comprises archiving a given file from the front-end file system 102 in the back-end file system 104 responsive to a link to that file being stored in a corresponding one of the archive directories 118 of the front-end file system 102.

As indicated previously, in conjunction with the movement of data between one or more storage tiers 112 of the front-end file system 102 and one or more storage tiers 114 of the back-end file system 104, a given one of the data mover modules 106 may split a given file received from the front-end file system 102 into multiple smaller files for storage in the back-end file system 104. For example, such splitting may be necessary due to file size restrictions in the nodes of the scale-out NAS cluster tiers of the back-end file system 104.

If a given file from the front-end file system 102 is split for storage in the back-end file system 104, the particular one of the data mover modules 106 controlling that movement associates with each of the smaller files a corresponding file extension from a designated namespace so as to permit the given file to be reconstructed upon retrieval of the smaller files from the back-end file system 104.

Similar splitting arrangements may be applied to file segments representing respective portions of a given file. For example, a given file may be stored in an OSS tier as multiple segments with each segment residing in a different OST of the OSS tier. The segments in such an arrangement may each be split for storage in the nodes of a scale-out NAS cluster tier, again depending on the segment size relative to the file size restrictions associated with the scale-out NAS nodes.

Also, in conjunction with splitting of files or file segments, one or more metadata files are also generated and stored in the back-end file system 104. For example, a given metadata file may indicate the manner in which split files or split file segments are distributed across multiple nodes of a given scale-out NAS cluster tier.

It should be noted that file segments and sub-segments are intended to fall within the general term "file" as broadly used herein. Such segments and sub-segments are identified by unique file names using file extensions from a designated namespace.

The manner in which a given file is stored across the nodes of the scale-out NAS cluster tier will generally depend upon the file size. For example, in an arrangement in which the given file is stored as multiple file segments across respective multiple OSTs of an OSS tier, the layout of the file segments over the OSTs can be preserved in the back-end file system 104 if the sizes of the file segments are less than or equal to the maximum file size permitted in the nodes of a scale-out NAS cluster tier.

A round robin distribution of the file segments across the scale-out NAS cluster nodes can be used. Thus, for example, if there are three scale-out NAS cluster nodes A, B and C and six file segments denoted SF0, SF1, SF2, SF3, SF4 and SF5, file segments SF0 and SF3 are stored on scale-out NAS cluster node A, file segments SF1 and SF4 are stored on scale-out NAS cluster node B, and file segments SF2 and SF5 are stored on scale-out NAS cluster node C, in accordance with the round robin distribution. The file layout is reflected in metadata stored in a corresponding metadata file which may be archived within the back-end file system. Other types of distributions of file segments can be used in other embodiments.

If the file segments stored on the respective Lustre OSTs are larger than the maximum file size permitted in the nodes of the scale-out NAS cluster tier, the file segments can each be split into two or more sub-segments that satisfy the file size limitations of the scale-out NAS cluster nodes. Again, round robin distribution or other types of distribution can be used in storing the sub-segments over the scale-out NAS cluster nodes.

It was noted above that data stored in the file systems 102 and 104 is migrated between multiple storage tiers as necessary to facilitate achievement of desired performance levels. For example, in the FIG. 1 embodiment, the data mover modules 106 may migrate data between multiple storage tiers of the front-end and back-end file systems in order to achieve desired levels of IO performance responsive to requests received from one or more clients. Data migration and other data movement determinations may be based at least in part on monitoring of current levels of performance within the system 100. Such monitoring in the FIG. 1 embodiment is assumed to be performed under the direction of the front-end file system 102 and may involve the use of sensors of a sensor network, or various other types of monitoring arrangements. The particular types of operating conditions and other factors that are monitored can be varied depending upon the needs of a given implementation.

The movement of a given data file, data object or other set of data between first and second storage tiers may be controlled at least in part based on information provided by a client running on or otherwise associated with a corresponding compute node.

When PLFS is used to implement the data mover modules 106, each data mover module illustratively comprises PLFS middleware including multiple synchronization daemons associated with respective OSSs of at least one of the storage tiers. A given such synchronization daemon is triggered by at least one of a read operation and a write operation associated with a client comprising an application running on a corresponding compute node.

Metadata associated with moved data is updated to reflect the movement between storage tiers. In the FIG. 1 embodiment, the updating of such metadata is assumed to be performed at least in part under the control of the data mover modules 106.

If the desired levels of performance have not been achieved, the manner in which the data is stored across the storage tiers 112 and 114 can be altered. In the context of the FIG. 1 embodiment, this generally involves the data mover modules 106 executing an alternative storage arrangement, possibly responsive to information received via HSM APIs, so as to facilitate achievement of the desired levels of performance in the system 100.

If the desired levels have been achieved, the data mover modules 106 continue to control the flow of data between the front-end and back-end file systems. The above-noted determination as to whether or not desired levels of performance have been achieved is then repeated periodically and further adjustment of the manner in which the data are distributed over the storage tiers 112 and 114 is made by the data mover modules 106 as needed, possibly in response to changing operating conditions and other factors.

Figure 2:
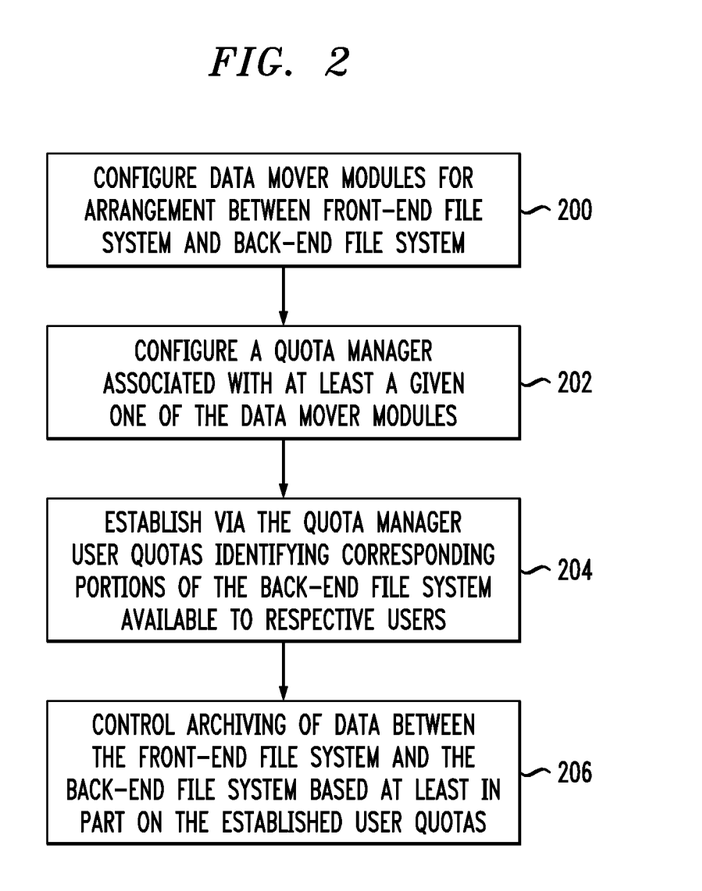
FIG. 2 is a flow diagram of an exemplary process implemented using the quota manager in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving one or more data mover modules arranged between a front-end file system and a back-end file system. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Other illustrative embodiments will now be described in more detail with reference to FIGS. 3, 4 and 5.

Figure 3:
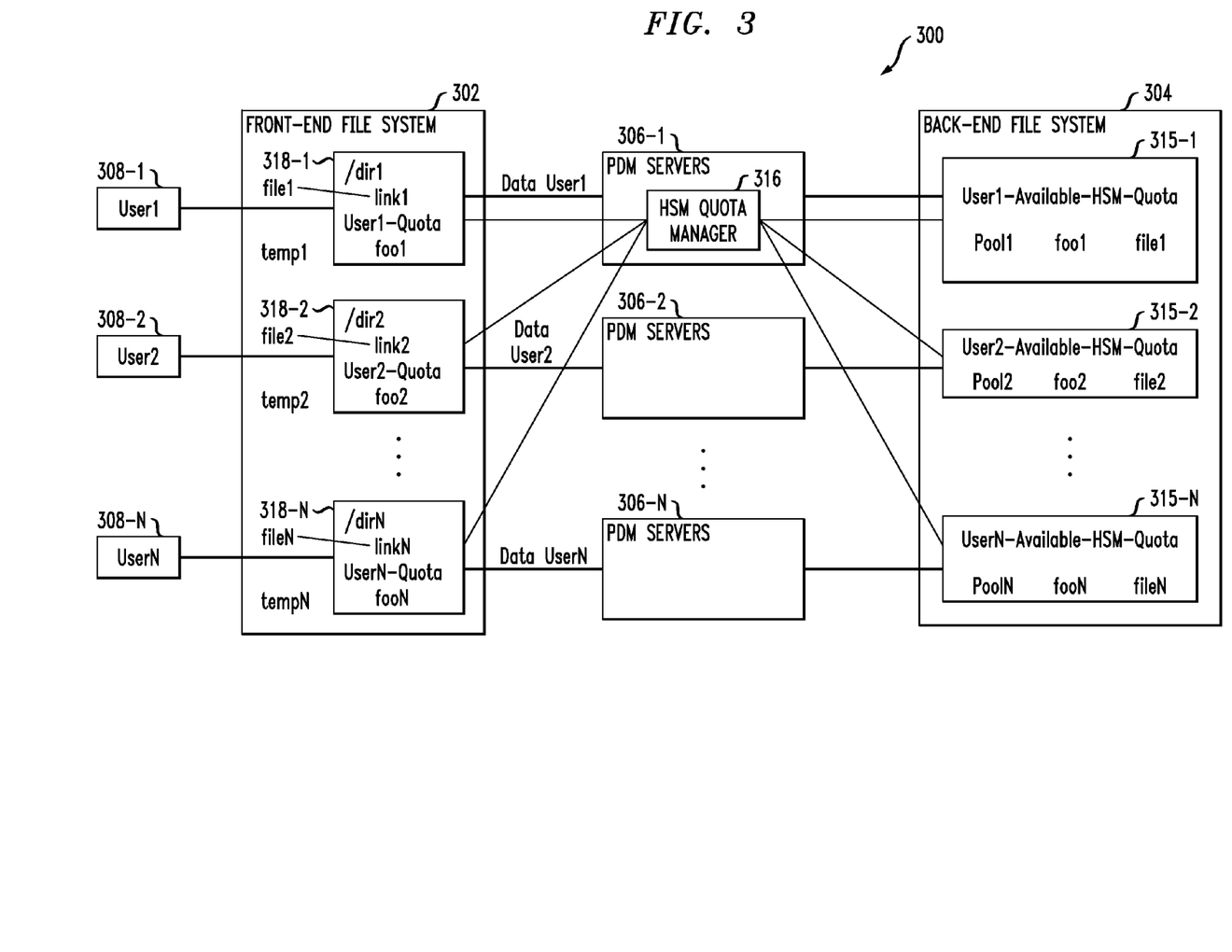
FIG. 3 shows another embodiment of an information processing system implementing a cluster file system comprising data mover modules and an associated quota manager for managing back-end user quotas.

FIG. 3 shows another information processing system 300. The information processing system 300 includes a cluster file system, with the cluster file system being implemented using a front-end file system 302, a back-end file system 304, and a plurality of data mover modules 306-1, 306-2, ... 306-N arranged between the front-end file system 302 and the back-end file system 304. The cluster file system is shared by a plurality of compute nodes 308. There is assumed to be a one-to-one association between respective ones of the compute nodes 308 and respective ones of the data mover modules 306, although this assumption need not apply in other embodiments. Accordingly, compute nodes 308-1, 308-2, ... 308-N are associated with respective users denoted User 1, User 2, ... User N, and movement of the data of those users is controlled by the respective data mover modules 306-1, 306-2, ... 306-N.

Each of the data mover modules 306 in this embodiment more particularly comprises a set of parallel data mover (PDM) servers as indicated in the figure. An HSM quota manager 316 is implemented within a particular one of the data mover modules 306, namely, the first data mover module 306-1, although it could additionally or alternatively have been implemented at least in part in one or more other ones of the data mover modules 306. For example, different portions of a given distributed implementation of the quota manager 316 may be implemented in respective ones of the data mover modules 306, such that the data mover modules 306 collectively provide the full functionality of the quota manager 316. The quota manager 316 may be implemented at least in part using, for example, a database associated with the set of PDM servers of the data mover module 306-1.

The data mover modules 306 are configured to control archiving of data between the front-end file system 302 and the back-end file system 304 for respective ones of the N users based at least in part on respective user quotas that are established by the quota manager 316, where these back-end user quotas identify corresponding portions 315 of the back-end file system 304 available to those users. More particularly, in this embodiment the back-end file system includes portions 315-1, 315-2, ... 315-N that are currently available to respective ones of the N users. These portions are identified by respective back-end user quotas denoted User1-Available-HSM-Quota, User2-Available-HSM-Quota, ... UserN-Available-HSM-Quota, and are also referred to as Pool 1, Pool 2, ... Pool N, respectively. The data mover modules 306 enforce the respective back-end user quotas established by the quota manager 316 for the respective users.

The front-end file system 302 in the present embodiment comprises a plurality of archive directories 318-1, 318-2, ... 318-N configured for respective ones of the N users. The quota manager 316 in the present embodiment not only establishes the above-noted back-end user quotas, but also establishes archive directory quotas for respective ones of the archive directories 318. The archive directories 318 are more particularly denoted as /dir1, /dir2, ... /dirN, and have respective archive directory quotas denoted as User1-Quota, User2-Quota, ... UserN-Quota. The archive directories 318 store respective links link1, link2, ... linkN to respective files denoted file1, file2, ... fileN. The archive directories 318 further include respective additional files denoted foo1, foo2, ... fooN.

There are also a number of scratch files temp1, temp2, ... tempN stored in the front-end file system 302 but not stored in respective ones of the archive directories 318. Also, there are no links to the scratch files stored in the archive directories 318. These scratch files are examples of what are more generally referred to herein as temporary files.

The data mover modules 306 are configured to archive a given file from the front-end file system 302 in the back-end file system 304 responsive to a link to that file being stored in a corresponding one of the archive directories 318 of the front-end file system 302. Thus, in the FIG. 3 embodiment, the files file1, file2, ... fileN that have respective links link1, link2, ... linkN stored in the respective archive directories 318 will be archived by the data mover modules 306 into the appropriate portions 315 of the back-end file system 304.

Additional files can be archived in the back-end file system 304 by placing the files themselves in the archive directories 318. For example, additional files foo1, foo2, . . . fooN are stored in respective ones of the archive directories 318 and thereby configured for archiving by the respective data mover modules 306 in the appropriate portions 315 of the back-end file system 304.

As indicated elsewhere herein, such an arrangement is beneficial in that it provides a high degree of control over the particular types of files from the front-end file system 302 that are archived in the back-end file system 304.

For example, archiving of the scratch files temp1, temp2, . . . tempN from the front-end file system 302 in the back-end file system 304 is effectively prevented in the present embodiment by preventing storage of those files or links to those files in the archive directories 318. This ensures that scratch files and other temporary files are not unnecessarily archived in a manner that would otherwise consume excessive amounts of the assigned portions 315 of the back-end file system 304.

The quota manager 316 can proactively adjust the back-end user quotas and the archive directory quotas in accordance with one or more specified policies. For example, if it is determined that one or more of the users have a need for an increase in their respective back-end user quotas, the quota manager 316 can interact with the back-end file system 304 via PDM servers of the data mover modules 306 to implemented the desired quota changes.

Figure 4:
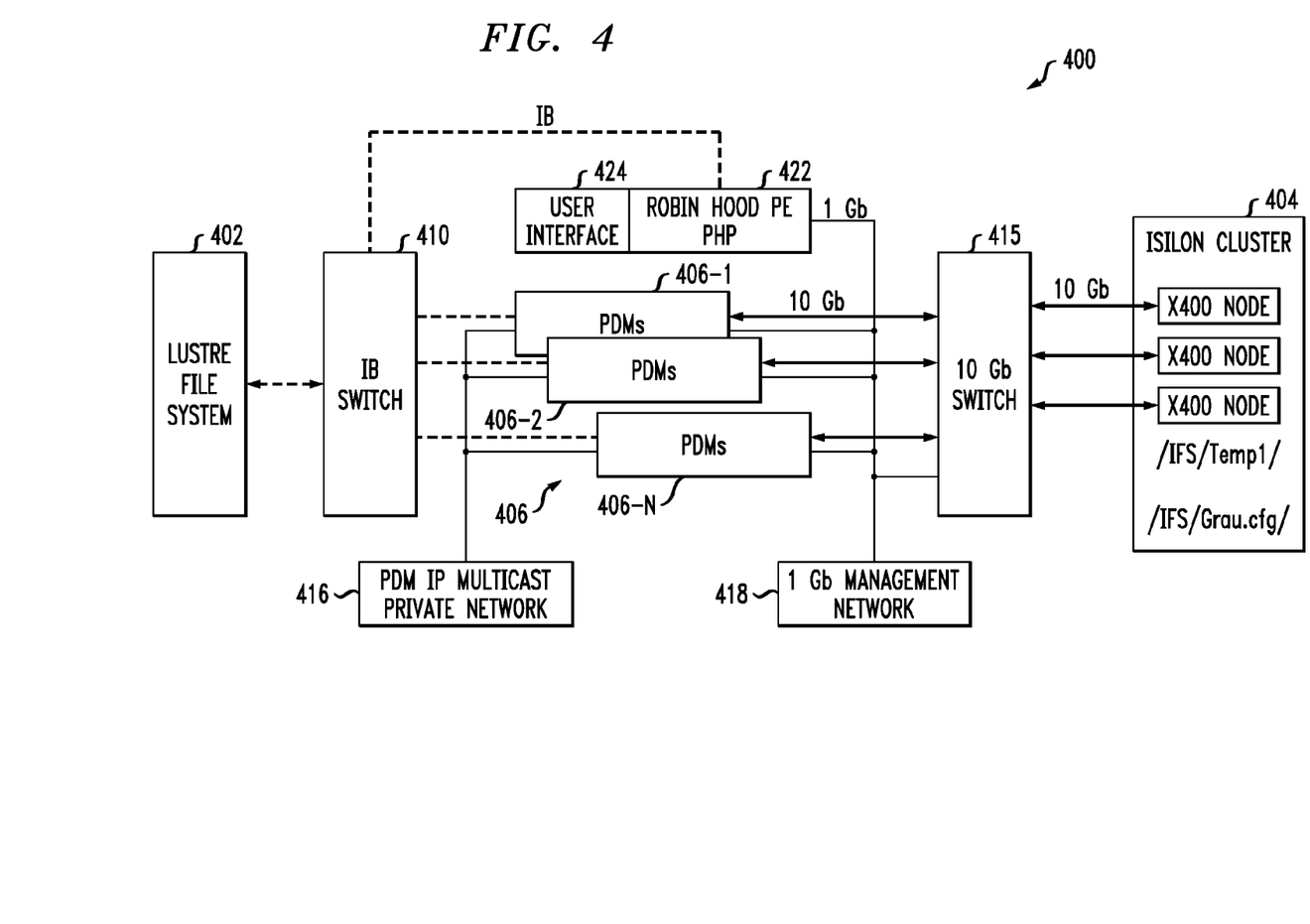
FIGS. 4 and 5 show respective other embodiments of cluster file systems each comprising data mover modules and an associated quota manager for managing back-end user quotas.

Referring now to FIG. 4, an information processing system 400 comprises a front-end file system 402 illustratively implemented as a Lustre file system, a back-end file system 404 illustratively implemented as an Isilon® cluster comprising multiple X400 nodes, and a plurality of data mover modules 406 illustratively implemented as respective PDMs arranged between the front-end file system 402 and the back-end file system 404. Exemplary directories in the back-end file system 404 include directories denoted /IFS/Temp1/ and /IFS/Grau.cfg/, where IFS denotes Isilon® file system.

The system 400 further comprises an InfiniBand (IB) switch 410 supporting communication between the front-end file system 402 and the data mover modules 406 over respective IB connections, and a 10 Gigabit (Gb) switch supporting communication between the data mover modules 406 and the back-end file system 404 over respective 10 Gb connections. The data mover modules 406 are also coupled to a PDM IP multicast private network 416, and to a 1 Gb management network 418. The front-end file system 402 can also communicate via IB switch 410 with a Robin Hood policy engine (PE) 422 utilizing PHP code. The PE 422 has an associated user interface 424 for providing user access to policy configuration and selection functions, and is also coupled to the 1 Gb management network 418.

Although not explicitly shown in FIG. 4, an HSM quota manager is assumed to be implemented in a particular one of the data mover modules 406, and to operate substantially in the manner previously described. For example, such a quota manager is illustratively configured to manage both back-end user quotas and archive directory quotas for respective users. The quota manager interacts with the PE 422 to determine appropriate policies for establishment and adjustment of these quotas.

Figure 5:
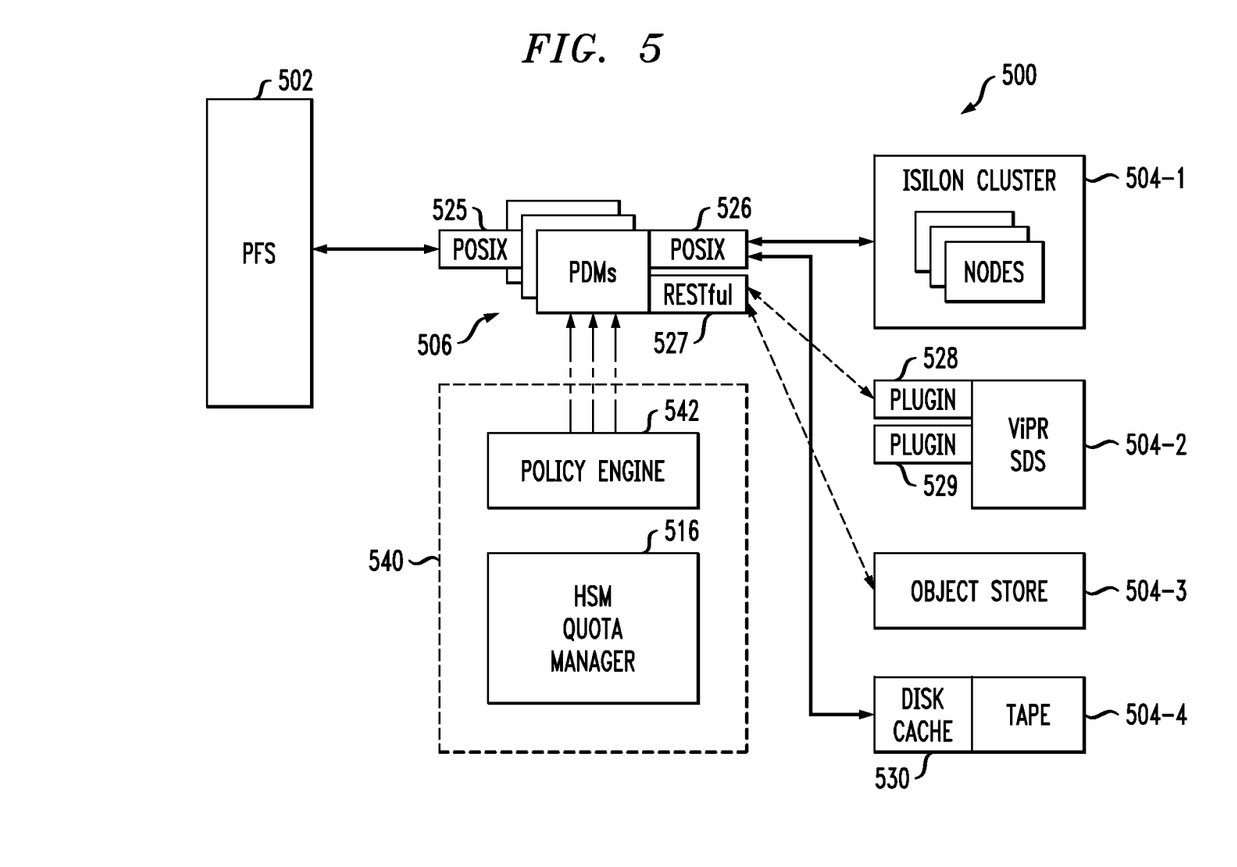

Referring now to FIG. 5, an information processing system 500 comprises a front-end file system 502 illustratively implemented as a parallel file system (PFS), multiple back-end file systems 504-1, 504-2, 504-3 and 504-4, and a plurality of data mover modules 506 illustratively implemented as respective PDMs arranged between the front-end file system 502 and the back-end file systems 504. The multiple back-end file systems 504-1, 504-2, 504-3 and 504-4 are illustratively implemented as comprising an Isilon® cluster comprising multiple nodes, ViPR® Software-Defined Storage (SDS) also commercially available from EMC Corporation, an object store, and a tape system, respectively. Numerous alternative arrangements of one or more back-end file systems can be used in other embodiments. The front-end file system configuration can also be varied, as indicated previously.

The system 500 further comprises an HSM quota manager 516 which, like the quota manager referred to in the context of FIG. 4, is assumed to operate in a manner similar to quota managers 116 and 316 of FIGS. 1 and 3.

The data mover modules 506 communicate with the front-end file system 502 and certain ones of the back-end file systems 504 via POSIX interfaces 525 and 526. The data mover modules 506 communicate with other ones of the back-end file systems via one or more RESTful interfaces 527. More particularly, the data mover modules 506 communicate with the back-end file systems 504-1 and 504-4 via the POSIX interfaces 526 and communicate with the back-end file systems 504-2 and 504-3 via the RESTful interfaces 527. In communicating with the back-end file system 504-2, the RESTful interfaces 527 communicate with plugin modules 528 and 529. In communicating with the back-end file system 504-4, the POSIX interfaces 526 communicate with a disk cache 530.

The quota manager 516 in the present embodiment is part of a system component 540 that is illustratively implemented externally to the data mover modules 506 and further incorporates a policy engine 542.

It should be understood that the particular front-end and back-end file system arrangements and other system components as illustrated FIGS. 3, 4 and 5 are presented by way of illustrative example only, and should not be construed as limiting in any way. The embodiments of FIGS. 3, 4 and 5 may be viewed as exemplary arrangements in which data mover modules are implemented as respective parallel data movers each controlling movement of data between front-end and back-end file systems, possibly based on information received via corresponding HSM APIs.

The disclosed arrangements can be used to construct a high-performance cluster file system using any desired arrangement of front-end and back-end file systems. Moreover, the use of data mover modules arranged between a front-end file system and a back-end file system significantly expands the number and type of HSM targets that may be used, thereby substantially improving system flexibility.

Advantageously, the use of a quota manager as disclosed herein in association with a plurality of data mover modules facilitates the provision of optimal HSM with selective archiving of files in a back-end file system. This helps to ensure that the allocated portions of the back-end file system are appropriately sized for their respective users, while also avoiding unnecessary archiving of scratch files or other temporary files that would otherwise waste archive space in the back-end file system. The allocated portions of the back-end file system can grow or shrink as needed to accommodate the changing requirements of the respective users. For example, the quota manager can proactively recommend increases or decreases in the archive space allocated to respective users, therefore ensuring that there will always be adequate space to archive desired application files.

Illustrative embodiments disclosed herein also make it possible to dynamically balance the conflicting requirements of storage capacity and IO throughput, thereby avoiding situations in which either performance is less than optimal or the costs of implementing the system become excessive. Arrangements of this type can provide further acceleration of IO operations in the system 100, leading to enhanced system performance relative to conventional arrangements, while additionally or alternatively providing an ability to achieve particular levels of performance at lower cost.

It is to be appreciated that the particular file system and processing device arrangements and associated storage functionality illustrated in FIGS. 1-5 are exemplary only, and numerous other arrangements may be used in other embodiments.

For example, the disclosed techniques may be adapted in a straightforward manner for providing efficient access to data distributed over more than two distinct types of storage tiers, including a wide variety of storage tiers other than the OSS tiers and scale-out NAS cluster tiers described in conjunction with the FIG. 1 embodiment.

It was noted above that portions of the information processing system 100 may be implemented using one or more processing platforms. Illustrative embodiments of such platforms will now be described in greater detail. Although described in the context of system 100, these platforms may also be used to implement at least portions of the information processing systems of FIGS. 3, 4 and 5, as well as other information processing systems in other embodiments of the invention.

Figure 6:
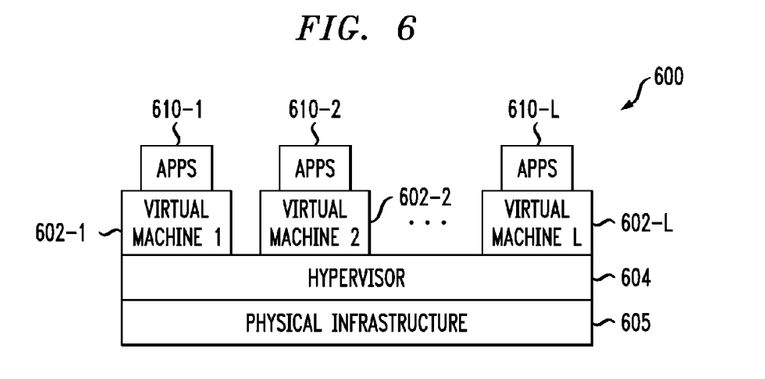
FIGS. 6 and 7 show examples of processing platforms that may be utilized to implement at least a portion of each of the systems of FIGS. 1 and 3-5.
Figure 7:
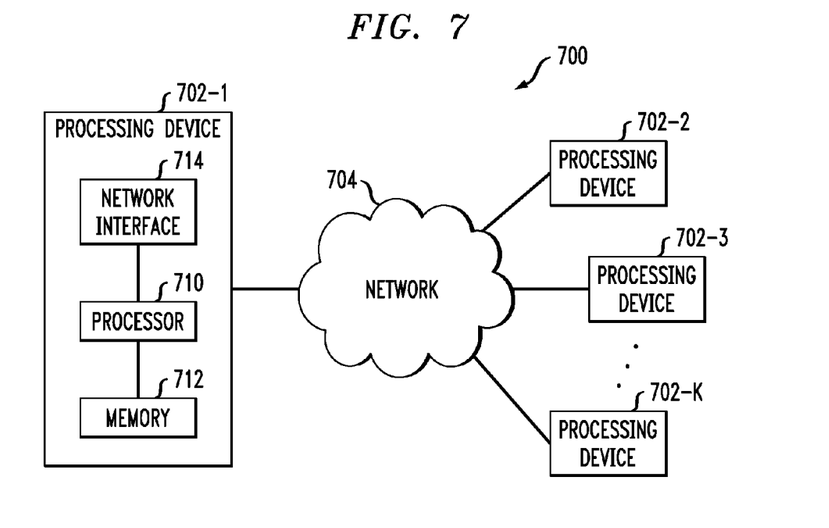

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of a burst buffer appliance or other component of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a data mover module or an associated front-end or back-end file system as disclosed herein can be implemented at least in part in the form of one or more software programs stored in memory and executed by a processor of a processing device such as one of the virtual machines 602 or one of the processing devices 702. For example, the data mover modules 106 and the HSM quota manager 116 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, file systems and computer systems that can benefit from the enhanced flexibility provided in hierarchical storage management. Also, the particular configurations of system and device elements shown in FIGS. 1 and 3-7 can be varied in other embodiments. Thus, for example, the particular type of front-end file systems, data mover modules, quota managers and back-end file systems deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device implementing a front-end file system comprising a plurality of archive directories configured for respective ones of a plurality of users;
    the at least one processing device implementing a back-end file system;
    the at least one processing device implementing a plurality of data mover modules arranged between the front-end and back-end file systems; and
    the at least one processing device implementing a quota manager associated with at least a given one of the plurality of data mover modules;
    wherein the data mover modules are configured to control archiving of data between the front-end file system and the back-end file system for respective ones of the users based at least in part on respective user quotas established by the quota manager and identifying corresponding portions of the back-end file system available to said users; and
    wherein the data mover modules are configured to archive a given file from the front-end file system in the back-end file system responsive to a link to that file being stored in a corresponding one of the archive directories of the front-end file system;
    the data mover modules thereby being configured to support selective archiving of files from the front-end file system in the back-end file system responsive to respective links to those files being stored in corresponding ones of the archive directories, while automatically preventing archiving of other files for which such links are not stored in corresponding ones of the archive directories, so as to conserve storage space in the back-end file system and facilitate conformance with the user quotas;
    the respective links to the selectively archived files thereby being stored in at least one of the archive directories;
    wherein the quota manager is further configured to establish archive directory quotas for respective ones of the archive directories and to proactively recommend changes to the archive directory quotas based on current sizes of the archive directories relative to the established archive directory quotas.

2. The apparatus of claim 1 wherein archiving of temporary files from the front-end file system in the back-end file system is prevented by preventing storage of links to the temporary files in the archive directories.

3. The apparatus of claim 1 wherein said archive directories include the respective archive directory quotas.

4. The apparatus of claim 1 wherein the quota manager has an associated policy engine providing one or more policies for use by the quota manager in establishing the user quotas identifying corresponding portions of the back-end file system available to said users.

5. The apparatus of claim 1 wherein the quota manager is implemented internally to a given one of the data mover modules.

6. The apparatus of claim 1 wherein the data mover modules enforce the respective user quotas for their corresponding users.

7. The apparatus of claim 1 further comprising a plurality of back-end file systems implemented by the at least one processing device with the data mover modules being configured to control archiving of data between the front-end file system and each of the back-end file systems responsive to user quotas established by the quota manager for each of the back-end file systems.

8. The apparatus of claim 1 wherein the front-end file system and back-end file system are associated with respective different sets of one or more hierarchical storage tiers for use in hierarchical storage management.

9. The apparatus of claim 1 further comprising a plurality of compute nodes coupled to the front-end file system and wherein the data mover modules are implemented at least in part utilizing software running on respective ones of the compute nodes.

10. The apparatus of claim 1 wherein a given one of the data mover modules comprises a plurality of server nodes that are synchronized with one another utilizing a message passing interface (MPI) protocol.

11. The apparatus of claim 1 wherein the data mover modules are implemented at least in part utilizing a virtual layer of a parallel log-structured file system (PLFS) and wherein the virtual layer comprises PLFS middleware implemented by the at least one processing device and configured to migrate files between the front-end and back-end file systems.

12. The apparatus of claim 1 wherein the front-end file system comprises a hierarchical storage management application programming interface and wherein the data mover modules are configured to control movement of data between the front-end file system and the back-end file system responsive to information received via the hierarchical storage management application programming interface.

13. A processing platform comprising the apparatus of claim 1.

14. A method comprising:
    configuring a plurality of data mover modules for arrangement between a front-end file system and a back-end file system;
    configuring a quota manager associated with at least a given one of the plurality of data mover modules;

establishing via the quota manager a plurality of user quotas identifying corresponding portions of the back-end file system available to respective users; and controlling archiving of data between the front-end file system and the back-end file system via the data mover modules based at least in part on the established user quotas;

wherein the front-end file system comprises a plurality of archive directories configured for respective ones of said users and controlling archiving further comprises archiving a given file from the front-end file system in the back-end file system via one or more of the data mover modules responsive to a link to that file being stored in a corresponding one of the archive directories of the front-end file system;

the data mover modules thereby being configured to support selective archiving of files from the front-end file system in the back-end file system responsive to respective links to those files being stored in corresponding ones of the archive directories, while automatically preventing archiving of other files for which such links are not stored in corresponding ones of the archive directories, so as to conserve storage space in the back-end file system and facilitate conformance with the user quotas;

the respective links to the selectively archived files thereby being stored in at least one of the archive directories;

wherein the quota manager is further configured to establish archive directory quotas for respective ones of the archive directories and to proactively recommend changes to the archive directory quotas based on current sizes of the archive directories relative to the established archive directory quotas; and wherein the configuring, establishing and controlling are implemented using at least one processing device comprising a processor coupled to a memory.

15. An article of manufacture comprising a non-transitory processor-readable storage medium having stored therein program code of one or more software programs, wherein the program code when executed by at least one processing device comprising a processor coupled to a memory causes the at least one processing device:

to configure a plurality of data mover modules for arrangement between a front-end file system and a back-end file system;

to configure a quota manager associated with at least a given one of the plurality of data mover modules;

to establish via the quota manager a plurality of user quotas identifying corresponding portions of the back-end file system available to respective users; and to control archiving of data between the front-end file system and the back-end file system via the data mover modules based at least in part on the established user quotas;

wherein the front-end file system comprises a plurality of archive directories configured for respective ones of said users and controlling archiving further comprises archiving a given file from the front-end file system in the back-end file system via one or more of the data mover modules responsive to a link to that file being stored in a corresponding one of the archive directories of the front-end file system;

the data mover modules thereby being configured to support selective archiving of files from the front-end file system in the back-end file system responsive to respective links to those files being stored in corresponding ones of the archive directories, while automatically preventing archiving of other files for which such links are not stored in corresponding ones of the archive directories, so as to conserve storage space in the back-end file system and facilitate conformance with the user quotas;

the respective links to the selectively archived files thereby being stored in at least one of the archive directories;

wherein the quota manager is further configured to establish archive directory quotas for respective ones of the archive directories and to proactively recommend changes to the archive directory quotas based on current sizes of the archive directories relative to the established archive directory quotas.

16. The apparatus of claim 1 wherein the apparatus is implemented in a cluster file system coupled to a computer system in an information processing system, the computer system comprising a plurality of compute nodes.

17. The method of claim 14 wherein a given one of the data mover modules comprises a plurality of server nodes that are synchronized with one another utilizing a message passing interface (MPI) protocol.

18. The method of claim 14 wherein the data mover modules are implemented at least in part utilizing a virtual layer of a parallel log-structured file system (PLFS) and wherein the virtual layer comprises PLFS middleware configured to migrate files between the front-end and back-end file systems.

19. The method of claim 14 wherein the front-end file system comprises a hierarchical storage management application programming interface and wherein the data mover modules are configured to control movement of data between the front-end file system and the back-end file system responsive to information received via the hierarchical storage management application programming interface.

20. The article of manufacture of claim 15 wherein the front-end file system comprises a hierarchical storage management application programming interface and wherein the data mover modules are configured to control movement of data between the front-end file system and the back-end file system responsive to information received via the hierarchical storage management application programming interface.

* * * * *